United States Patent
Brown

(10) Patent No.: US 11,316,665 B2
(45) Date of Patent: *Apr. 26, 2022

(54) GENERATING CRYPTOGRAPHIC FUNCTION PARAMETERS BASED ON AN OBSERVED ASTRONOMICAL EVENT

(71) Applicant: Certicom Corp., Mississauga (CA)

(72) Inventor: Daniel Richard L. Brown, Mississauga (CA)

(73) Assignee: Certicom Corp., Mississauga (CA)

( * ) Notice: Subject to any disclaimer, the term of this patent is extended or adjusted under 35 U.S.C. 154(b) by 200 days.

This patent is subject to a terminal disclaimer.

(21) Appl. No.: 16/449,288

(22) Filed: Jun. 21, 2019

(65) Prior Publication Data

US 2019/0319783 A1 Oct. 17, 2019

Related U.S. Application Data

(63) Continuation of application No. 14/691,383, filed on Apr. 20, 2015, now Pat. No. 10,361,844.

(51) Int. Cl.
*H04L 29/06* (2006.01)
*H04L 9/06* (2006.01)
*G09C 5/00* (2006.01)
*H04L 9/30* (2006.01)
*G06F 7/58* (2006.01)

(52) U.S. Cl.
CPC ............. *H04L 9/0662* (2013.01); *G09C 5/00* (2013.01); *H04L 9/3006* (2013.01); *H04L 9/3066* (2013.01); *G06F 7/582* (2013.01)

(58) Field of Classification Search
USPC .......................................... 380/30
See application file for complete search history.

(56) References Cited

U.S. PATENT DOCUMENTS

| 5,579,316 | A | 11/1996 | Venters |
| 5,850,450 | A | 12/1998 | Schweitzer |
| 6,490,352 | B1 | 12/2002 | Schroeppel |
| 7,240,338 | B1 | 7/2007 | Bell |
| 7,330,549 | B2 | 2/2008 | Girault |
| 8,108,683 | B2 | 1/2012 | Canetti et al. |
| 8,984,292 | B2 | 3/2015 | Lind et al. |

(Continued)

FOREIGN PATENT DOCUMENTS

| CN | 102170636 | 8/2011 |
| WO | 2016128463 | 8/2016 |

OTHER PUBLICATIONS

Communication Pursuant to Article 94(3) issued in European Application No. 16782422.6 dated Feb. 1, 2021, 5 pages.

(Continued)

*Primary Examiner* — Sakinah White Taylor
(74) *Attorney, Agent, or Firm* — Fish & Richardson P.C.

(57) ABSTRACT

Methods, systems, and computer programs for generating cryptographic function parameters are described. In some examples, astronomical data from an observed astronomical event is obtained. A pseudorandom generator is seeded based on the astronomical data. After seeding the pseudorandom generator, an output from the pseudorandom generator is obtained. A parameter for a cryptographic function is generated by operation of one or more data processors. The parameter is generated from the output from the pseudorandom generator.

22 Claims, 4 Drawing Sheets

(56) References Cited

U.S. PATENT DOCUMENTS

| | | | |
|---|---|---|---|
| 9,014,500 B2* | 4/2015 | Shuster | G06T 5/003 |
| | | | 382/254 |
| 9,465,582 B1* | 10/2016 | Whelan | H04L 9/3236 |
| 2002/0131592 A1 | 9/2002 | Hinnant | |
| 2003/0059042 A1 | 3/2003 | Okeya | |
| 2004/0086117 A1 | 5/2004 | Petersen | |
| 2004/0181585 A1 | 9/2004 | Atkinson | |
| 2006/0235917 A1 | 10/2006 | Manber | |
| 2008/0049939 A1 | 2/2008 | Canetti | |
| 2008/0130873 A1* | 6/2008 | Bolotov | H04L 9/3066 |
| | | | 380/28 |
| 2008/0175377 A1* | 7/2008 | Merrill | G06F 21/36 |
| | | | 380/30 |
| 2009/0074179 A1* | 3/2009 | Futa | H04L 9/3252 |
| | | | 380/28 |
| 2010/0067688 A1 | 3/2010 | Au et al. | |
| 2010/0142705 A1 | 6/2010 | Reffe | |
| 2011/0040977 A1 | 2/2011 | Farrugia | |
| 2011/0150212 A1* | 6/2011 | Spalka | H04L 9/3073 |
| | | | 380/44 |
| 2011/0283115 A1 | 11/2011 | Junod | |
| 2012/0300925 A1 | 11/2012 | Zaverucha et al. | |
| 2013/0136255 A1 | 5/2013 | Brown | |
| 2014/0040338 A1 | 2/2014 | Van Der Sluis et al. | |
| 2014/0314231 A1 | 10/2014 | Gilbert | |
| 2015/0117636 A1 | 4/2015 | Best | |
| 2015/0169462 A1 | 6/2015 | Valsanen et al. | |
| 2015/0270965 A1 | 9/2015 | Fischer | |
| 2017/0063534 A1 | 3/2017 | Brown | |
| 2017/0063535 A1 | 3/2017 | Brown | |
| 2017/0063536 A1 | 3/2017 | Brown | |
| 2019/0356666 A1 | 11/2019 | Brown | |

OTHER PUBLICATIONS

Communication Under Rule 71 (3) EPC issued in European Application No. 16782424.2 dated Oct. 6, 2020, 7 pages.

Anonymous, "GitHub—jackjack-jj/jeeq: ECOSA encryption", Jun. 16, 2014, [retrieved on May 7, 2020] Retrieved from : URL<:https://github.com/jackjack-jj/jeeq>, 1 page.

Communication Pursuant to Article 94(3) issued in European Application No. 16782422.6 dated May 12, 2020, 7 pages.

Communication Pursuant to Article 94(3) EPC issued in European Application No. 16782423,4 dated Oct. 31, 2019, 5 pages.

Communication Pursuant to Article 94(3) issued in European Application No. 16782424.2 dated Sep. 2, 2019, 5 pages.

Non-Final Office Action issued in U.S. Appl. No. 16/529,629 dated Jul. 13, 2020, 36 pages.

Office Action issued in Chinese Application No. 201680036017.X dated Sep. 2, 2020, 22 pages (With English Translation).

Interview Summary issued in U.S. Appl. No. 16/529,629 dated Nov. 6, 2020, 1 page.

Notice of Allowance issued in U.S. Appl. No. 16/529,629 dated Nov. 6, 2020, 10 pages.

Communication Pursuant to Article 94(3) issued in European Application No. 16782424.2 dated Apr. 30, 2020, 4 pages.

Communication Pursuant to Article 94(3) issued in European Application No. 16782423.4 dated Dec. 5, 2019, 5 pages.

Bernstein et al., "High-speed high-security signatures." International Workshop on Cryptographic Hardware and Embedded Systems. Springer, Berlin, Heidelberg, Sep. 28, 2011, 19 pages.

Communication Pursuant to Article 94(3) issued in European Application No. 16782422.6 dated Oct. 4, 2019, 6 pages.

Canetti et al.; "Cryptography From Sunspots: How to Use an Imperfect Reference String"; 48th Annual IEEE Symposium on Foundations of Computer Science; 2007; 11 pages.

"Wikipedia" [online], "Curve25519," Originally posted on Wikipedia Jun. 14, 2008, most recently updated on Aug. 28, 2015, [retrieved on Sep. 16, 2015], Retrieved from the Internet: URL<https://en.wikipedia.org/wiki/Curve25519>, 4 pages.

ANSI X9.62:2005, "Public Key Cryptography for the Financial Services Industry, The Elliptic Curve Digital Signature Algorithm (ECDSA)," American National Standards Institute, Nov. 16, 2005, 163 pages.

Bernstein et al., "How to manipulate curve standards: a white paper for the black hat," Jul. 22, 2014, Retrieved from the Internet: URL <http://safecurves.cr.yp.to/bada55/bada55-20140722.pdf>, 18 pages.

Bernstein et al., "SafeCurves: choosing safe curves for elliptic-curve cryptography," [online], last updated Jul. 23, 2014, [retrieved on Sep. 14, 2015], Retrieved from the Internet: URL <http://safecurves.cr.yp.to/bada55.html>, 3 pages.

Bernstein, "Curve25519: new Diffie-Hellman speed records," Public Key Cryptography—PKC 2006, Lecture Notes in Computer Science, 3958:207-228.

Black et al., "Elliptic Curve Cryptography (EFF) Nothing Up My Sleeve (NUMS) Curves and Curve Generation," Network Working Group, Internet Draft, Aug. 26, 2014, Retrieved from the Internet: URL<http://datatracker.ietf.org/meeting/90/agenda/cfrg-drafts.pdf>, 15 pages.

Bos et al., "Selecting Elliptic Curves for Cryptography: An Efficiency and Security Analysis," Journal of Cryptographic Engineering, May 2015, 29 pages.

Brown, "CM55: special prime-field elliptic curves almost optimizing den Boer's reduction between Diffie-Hellman and discrete logs," Feb. 24, 2015, 57 pages.

Brown, "SEC1: Elliptic Curve Cryptography," Standards for Efficient Cryptography, May 21, 2009, 144 pages.

Correspondence from Inventor to Client re "[Cfrg] Bad and Rigid Curve (Rigid «NUMS)," dated Aug. 7, 2014, 1 page.

ECC Brainpool, "ECC Brainpool Standard Curves and Curve Generation," v1.0, Oct. 19, 2005, 43 pages.

Bernstein et al., "TweetNaCl: A crypto library in 100 tweets," Dec. 29, 2013, pp. 1-18, <https://cryptojedi.org/papers/tweetnacl-20131229.pdf>.

Bernstein et al., "The Salsa20 Family of Stream Cipher Designs," Lecture Notes in Computer Science, Springer Berlin Heidelberg, Berlin, Heidelberg, Chapter 2, 3, and 4, Jun. 19, 2008, 14 pages.

Kaliski, "Elliptic Curves and Cryptography: A Pseudorandom Bit Generator and Other Tools," Doctoral Dissertation, Massachusetts Institute of Technoloyg, Feb. 1988, 169 pages.

Lee et al., "A Random Number Generator Based on Elliptic Curve Operations," An International Journal Computers and Mathematics with Applications EUMER Computers and Mathematics with Applications, Chapter 1, 2, and 3, vol. 47, Jan. 1, 2004, 10 pages.

International Search Report and Written Opinion issued by the International Searching Authority in Application No. PCT/CA2016/050450, dated Jun. 16, 2016—new art cited.

International Search Report and Written Opinion issued by the International Searching Authority in Application No. PCT/CA2016/050452, dated Jun. 23, 2016—new art cited.

International Search Report and Written Opinion issued by the International Searching Authority in Application No. PCT/CA2016/050451, dated Jun. 28, 2016—new art cited.

Extended European Search Report issued in European Application No. 16782424.2 dated Oct. 26, 2018, 7 pages.

Extended European Search Report issued in European Application No. 16782423.4 dated Oct. 22, 2018, 8 pages.

Extended European Search Report issued in European Application No. 16782422.6 dated Nov. 14, 2018, 9 pages.

Office Action issued in U.S. Appl. No. 14/691,383 dated Mar. 7, 2017; 22 pages—no new art cited.

Office Action issued in U.S. Appl. No. 14/691,383 dated Aug. 8, 2017; 20 pages—new art cited.

Advisory Action issued in U.S. Appl. No. 14/691,383 dated Oct. 17, 2017; 5 pages—new art cited.

Office Action issued in U.S. Appl. No. 14/691,337 dated Nov. 7, 2017; 17 pages—new art cited.

Notice of Allowance issued in U.S. Appl. No. 14/691,337 dated Jan. 24, 2018, 11 pages.

Notice of Allowance issued in U.S. Appl. No. 14/691,372 dated Jan. 22, 2018, 11 pages.

Office Action issued in U.S. Appl. No. 14/691,383 dated Feb. 2, 2018, 25 pages.

(56) References Cited

OTHER PUBLICATIONS

Office Action issued in U.S. Appl. No. 14/691,337 dated May 17, 2018, 9 pages.
Notice of Allowance issued in U.S. Appl. No. 14/691,372 dated May 23, 2018, 12 pages.
Final Office Action issued in U.S. Appl. No. 14/691,383 dated Jul. 26, 2018, 20 pages.
Notice of Allowance issued in U.S. Appl. No. 14/691,337 dated Oct. 22, 2018, 11 pages.
Interview Summary issued in U.S. Appl. No. 14/691,383 dated Oct. 10, 2018, 1 page.
Notice of Allowance issued in U.S. Appl. No. 14/691,383 dated Oct. 24, 2018, 9 pages.
Notice of Allowance issued in U.S. Appl. No. 14/691,337 dated Nov. 28, 2018, 15 pages.
Notice of Allowance issued in United States Office U.S. Appl. No. 14/691,383 dated Mar. 19, 2019, 16 pages.

\* cited by examiner

//cryptography
GENERATING CRYPTOGRAPHIC FUNCTION PARAMETERS BASED ON AN OBSERVED ASTRONOMICAL EVENT

CROSS REFERENCE TO RELATED APPLICATION

This application is a continuation of U.S. Non-Provisional application Ser. No. 14/691,383, filed on Apr. 20, 2015, the entire contents of which is hereby expressly incorporated by reference herein in its entirety.

BACKGROUND

This specification relates to generating cryptographic function parameters for a cryptography system. Cryptography systems enable secure communication over public channels. Cryptography systems can perform cryptographic operations, such as, for example, encrypting or decrypting data according to an encryption scheme to provide confidentiality, or generating or verifying signatures to provide authenticity. In some cryptography systems, the cryptographic function parameters are selected to improve performance or to circumvent certain types of attacks.

BRIEF DESCRIPTION OF THE DRAWINGS

Like reference numbers and designations in the various drawings indicate like elements.

DETAILED DESCRIPTION

Figure 1:
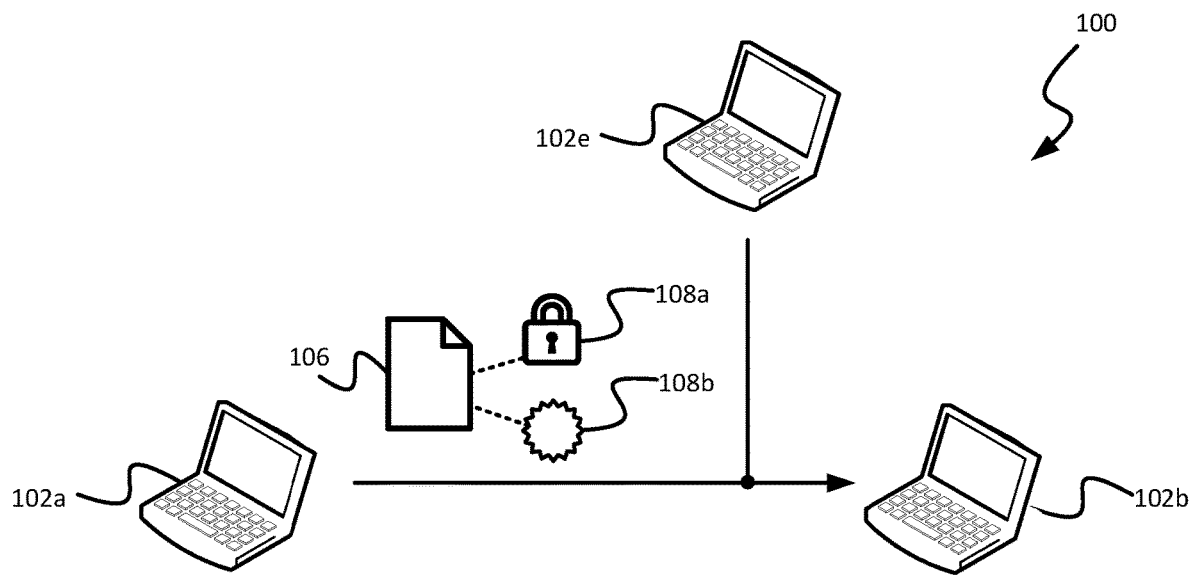
FIG. 1 is a schematic diagram showing aspects of an example cryptography system.

In a general aspect, methods, systems, and computer programs for generating cryptographic function parameters are described. In some aspects, astronomical data from an observed astronomical event is obtained. A pseudorandom generator is seeded based on the astronomical data. After seeding the pseudorandom generator, an output from the pseudorandom generator is obtained. A parameter for a cryptographic function is generated by operation of one or more data processors. The parameter is generated from the output from the pseudorandom generator.

In some implementations, the observed astronomical event includes an event that is globally observable and globally verifiable.

In some implementations, the observed astronomical event includes a sunspot, and obtaining the astronomical data includes computing the astronomical data based on an attribute of the sunspot.

In some implementations, the observed astronomical event includes a supernova, and obtaining the astronomical data includes computing the astronomical data based on an attribute of the supernova.

In some implementations, the observed astronomical event includes a meteoroid discovery, and obtaining the astronomical data includes computing the astronomical data based on an attribute of the meteoroid.

In some implementations, the observed astronomical event includes an event on an extraterrestrial planet, and obtaining the astronomical data includes computing the astronomical data based on an attribute of the event.

In some implementations, a customized set of parameters for the cryptographic function is generated. The customized set of parameters are based on the astronomical data and a user-selected input value.

In some implementations, the astronomical event and the pseudorandom generator are specified by a cryptosystem protocol, and the cryptosystem protocol permits a range of values for the user-selected input value.

In some implementations, the cryptographic function includes an elliptic curve function, and the parameter includes a constant for the elliptic curve function.

In some implementations, the parameter is used to perform cryptographic operations according to a cryptographic communication protocol.

In some implementations, a full set of parameters for the cryptographic function is generated from the output from the pseudorandom generator.

A cryptography system can use cryptographic algorithms or functions to perform cryptographic operations such as encrypting or decrypting according to an encryption scheme to provide confidentiality, and generating or verifying a signature for authenticity. The cryptography system can be configured, for example, by selecting the cryptographic functions, parameters of the cryptographic functions, and other features of the system.

In some implementations, the parameters for the cryptographic functions can be generated using a compact source code. For instance, the source code can define seed information and a pseudorandom function in a compact manner, which may reduce the possibility of manipulation in some cases. In some cases, the parameters for the cryptographic functions can be generated based on an output obtained from the pseudorandom function after the pseudorandom function has been seeded with the seed information. In some examples, the source code includes a compact definition of the pseudorandom function and the seed information (e.g., minimal complexity in terms of a computation measure).

In some implementations, the parameters can be generated using puzzle-based algorithms. For example, a puzzle can be used as a resource-intensifier to reduce the possibility that malicious parameters have been obtained by trial and error. In some implementations, puzzles can be iterated to amplify the difficulty of the puzzles and then applied to the pseudorandom function to hinder manipulations of the cryptographic function parameters.

In some implementations, randomness can be incorporated into the seed information, for example, to reduce the reliance on the pseudorandom function. As an example, the seed can include information obtained from a globally verifiable random source, such as astronomical events. In some instances, the cryptographic function parameters can be generated from the pseudorandom function seeded by an input incorporating randomness of one or more astronomical events.

Many cryptographic algorithms have parameters such that the algorithm will operate correctly over many choices of the parameters, yet the parameters are often meant to be fixed across a large number of uses of the algorithm. Here "operating correctly" means that the cryptographic algorithm appears to work for its user, but the parameter choice does not necessarily guarantee security. In some implementations, a correctly operating signature scheme is such a scheme where a second user will be able verify a first user's digital signature, or a second user will be able to decrypt a ciphertext generated by a first user for the second user. Typically, there are known instances or values of the parameters in which security can fail. Thus, the parameters need to be chosen carefully.

Some cryptographic parameters can be easily verified without significantly affecting the correctness of the cryptographic algorithm. In some systems, parameters that meet the requirements above appear as numerical constants in the definition of the cryptographic algorithm. Varying the parameters may include varying the numerical constants, and the parameters of the cryptographic algorithm can be referred to as the constants of the algorithm.

When the parameters are constants, they can be viewed as numbers, usually integers, in a certain range. Some easy-to-verify condition on the constants can ensure the correctness of the algorithm in some cases. Some other conditions may be needed to ensure resistance to known attacks. Resistance to attacks is typically more difficult to determine than correctness. Some examples of constants in cryptographic algorithms include the initial value and round constants in SHA-1, the round constants in AES, the exponent in RSA cryptosystems (with $2^{16}+1$ being commonly used), the two points P and Q in the Dual EC DRBG, and for elliptic curves, the field of definition of the elliptic curve, the curve coefficients a and b in the elliptic curve definition $y^2=x^3+ax+b$, the generator G of the elliptic group, with respect to which public keys, Diffie-Hellman shared secrets, and ECDSA signature are defined, the seed used to derive "verifiably random" elliptic curves such as NIST P-256. Although some of the example techniques in this disclosure are discussed with respect to selecting elliptic curves, the example techniques can be applied to a selecting constants for other cryptography algorithms.

In many cryptographic algorithms, two communicating users (e.g., two or more persons or sometimes the same person at two different times, as in the case of secure storage, operating computers or any other data processing apparatus) using the same parameters are necessary for correct operation. For example, if two strangers wish to exchange encrypted messages, then they need to use the same parameters of the encryption algorithm.

Occasionally, parameters can be negotiated at run-time between a small set of mutually trusting users. For example, in the case of Elliptic Curve Cryptography (ECC), some standards such as American National Standards Institute (ANSI) X9.62 and SEC1 (which are incorporated herein by reference) allow the parameters to be negotiated. However, such run-time negotiated parameters can require a considerable amount of pre-computation for determining a correct and secure set of parameters, such as computing the number of points on an elliptic curve, and require a cryptographic algorithm whose security depends on some parameters for securely negotiating the parameters. As such, a fixed set of algorithm parameters is typically used across a whole system, including a wide set of users.

FIG. 1 is a schematic diagram of an example cryptography system 100. The cryptography system 100 includes a sender terminal 102a, a recipient terminal 102b, and an adversary terminal 102e ("terminals 102"). The cryptography system 100 can include additional, fewer, or different components. For example, the cryptography system 100 may include storage devices, servers, additional terminals, and other features not shown in the figure.

The example terminals 102a, 102b can communicate with each other, and the example adversary terminal 102e can observe communication between terminals 102a, 102b. In some implementations, some or all of the components of the cryptography system 100 communicate with each other over one or more data networks or other types of communication links. For example, the terminals 102a, 102b may communicate with each other over a public data network, and the adversary terminal 102e may observe the communication by accessing the public data network. In some implementations, the terminals 102a, 102b can communicate over a private network or another type of secure communication link, and the adversary terminal 102e may gain access to some or all of the transmitted data.

The communication links utilized by cryptography system 100 can include any type of data communication network or other types of communication links. For example, the cryptography system 100 can utilize wired communication links, wireless communication links, and combinations thereof. As another example, the cryptography system 100 can utilize a wireless or wired network, a cellular network, a telecommunications network, an enterprise network, an application-specific public network, a Local Area Network (LAN), a Wide Area Network (WAN), a private network, a public network (such as the Internet), a WiFi network, a network that includes a satellite link, or another type of data communication network. In some instances, the cryptography system 100 can utilize a tiered network structure defined by firewalls or similar features that implement various levels of security.

The terminals 102a, 102b use cryptographic schemes (either encryption or signatures or both) to allow secure communication in the presence of an eavesdropper 102e. In the example shown in FIG. 1, the sender terminal 102a can send data to the recipient terminal 102b, and the terminals 102a, 102b have agreed upon an encryption scheme and parameters for implementing the encryption scheme. For example, the encryption scheme can include a public key encryption scheme, a symmetric key encryption scheme, or another type of scheme. The sender terminal 102a can use the encryption scheme to encrypt the data to be sent to the recipient terminal 102b. The encrypted data can be included in the message 106 that the sender terminal 102a sends to the recipient terminal 102b. In some cases, the message 106 includes encrypted data 108a (for confidentiality) or signed data 108b (for authenticity), or both. The recipient terminal 102b can receive the message 106 and use a decryption algorithm of the encryption scheme to recover the original (unencrypted) data. The cryptography system 100 can support additional or different types of communication. In some implementations, the encryption scheme utilizes digital certificates administered by a certificate authority. In some implementations, the terminals 102 exchange digitally signed messages, and other types of information.

The components of the cryptography system 100 can be implemented by any suitable computing systems or subsystems. For example, the terminals 102 can each be implemented using any suitable user device, server system, device or system components, or combinations of these and other types of computing systems. A computing system generally includes a data processing apparatus, a data storage medium, a data interface, and possibly other components. The data storage medium can include, for example, a random access memory (RAM), a storage device (e.g., a writable read-only memory (ROM), etc.), a hard disk, or another type of storage medium. A computing system can be preprogrammed or it can be programmed (and reprogrammed) by loading a program from another source (e.g., from a CD-ROM, from another computer device through a data network, or in another manner). A computing system may include an input/output controller coupled to input/output devices (e.g., a monitor, a keyboard, etc.) and to a communication link. In some implementations, the input/output devices can receive and transmit data in analog or digital form over communication links such as a serial link, wireless link (e.g., infrared, radio frequency, etc.), parallel link, or another type of link.

In some examples, the terminals 102 can be implemented as computing devices that can communicate based on a cryptographic scheme. The example terminals 102 are generally operable to receive, transmit, process, and store information. Although FIG. 1 shows three terminals 102, a cryptography system 100 may include any number of terminals. The cryptography system 100 can include groups or subgroups of terminals that can communicate with each other, but not necessarily with the terminals in other groups or subgroups. The cryptography system 100 can include terminals of disparate types, having different types of hardware and software configurations, and in a variety of different locations. For example, the sender terminal 102a, the recipient terminal 102b, and the adversary terminal 102e can all be implemented as different types of systems or devices. In some cases, multiple devices or subsystems can be identified together as a single terminal.

The terminals 102 typically include a data processing apparatus, a data storage medium, and a data interface. For example, the terminals 102 can include a memory, a data processor, and an input/output controller. A terminal can include user interface devices, for example, a monitor, touchscreen, mouse, or keyboard. The memory of the terminal can store messages and information associated with the cryptography system. For example, a terminal may store key data, digital certificate data, and other types of information. The memory of the terminal can store instructions (e.g., computer code) associated with computer applications, programs and computer program modules, and other resources.

The terminals 102 can be implemented as handheld devices such as smart phones, personal digital assistants (PDAs), portable media players, laptops, notebooks, tablets, and others. Terminals can include work stations, mainframes, non-portable computing systems, or devices installed in structures, vehicles, and other types of installations. Terminals can include embedded communication devices. For example, the terminals can include messaging devices that are embedded in smart system. Other types of terminals may also be used.

A terminal can be associated with a particular user entity, a particular user identity, or any combination thereof. One or more of the terminals can be associated with a human user. In some implementations, the terminals are not associated with any particular human user. One or more of the terminals can be associated with a particular device, a particular location, or other identifying information.

In some aspects of operation, the sender terminal 102a has a message to send to the recipient terminal 102b. The content of the message is not initially known to either the recipient terminal 102b or the adversary terminal 102e. The sender terminal 102a uses an encryption algorithm to encrypt the message, and the sender terminal 102a sends the message 106 to the recipient terminal 102b. The recipient terminal 102b has access to a secret value (e.g., a private key) that can be used to decrypt the message. In some instances, the sender terminal 102a uses a signing algorithm and its own secret value (e.g., another private key) to generate a digital signature for the message 106, and the sender terminal 102a sends the digital signature to the recipient terminal 102b (e.g., with the message). The recipient terminal 102b uses a public key to verify the digital signature.

In some cases, the adversary terminal 102e observes the encrypted message 106, but the adversary terminal 102e does not have access to the secret value that can be used to decrypt the message. As such, the adversary terminal 102e may launch an attack to compromise the security of the cryptographic scheme used by the sender terminal 102a and the recipient terminal 102b. Some attacks have a success rate, or cost, that varies in a way that depends upon the constants in the algorithm being attacked. As such, certain types of attack launched by the adversary terminal 102e in FIG. 1 have a higher chance of success than others.

Certain aspects of the example techniques related to choosing constants that resist attacks on cryptographic schemes are not uniform with respect to a constant. An attack on cryptographic schemes that is uniform with respect to a particular constant is an attack that is approximately equally effective for all values of the constant. For example, the Pollard rho attack against ECC is uniform with respect to the curve coefficients. Generally, a uniform attack can only be avoided by adjusting any other constants with respect to which the attack is non-uniform. In the case of the Pollard rho attack, the only remedy is to increase the field size.

Table 1 shows an example classification of attacks into six qualitative tiers in order of increasing departure from being uniform with respect to a constant. This example classification is provided for purposes of discussion.

TABLE 1

Classification of attacks on cryptographic schemes.

| Tier | Name | Example countermeasure | ECC example attacks |
|---|---|---|---|
| First | Unavoidable | Alter other constants | Pollard rho |
| Second | Insight-avoidable | Use special constant | Pohlig-Hellman (with CM), Possibly some side channel attacks. |
| Third | Search-avoidable | Search for safe constant | Pohlig-Hellman |
| Fourth | Insight-attackable | Choose own constant Trust other's constant | Pohlig-Hellman (smooth order) |
| Fifth | Search-attackable | Choose own constants Choose special "rigid" constants Trust other's constant | Hypothetical one-in-a-million attack, |
| Sixth | Randomly avoidable | Choose random constants Choose pseudorandom constants | Menezes-Okamoto-Vanstone (MOV) Smart-Araki-Satoh-Semaev (SASS) |

The first tier is uniform with respect to the constant, as discussed above. A second tier of attack admits some exceptional values of parameters that resist the attack, but the class of exceptional secure values of the constants represents a negligible fraction of the set of constants. These are attacks that can be resisted either by changing other parameters or constants of the attack, as above, or by finding the exceptional secure values of the attack. Because the fraction of secure values is negligible, the secure values cannot be feasibly found by random trial and error. Therefore, finding secure values requires some insight. In this case, the attack can be said to be insight-avoidable with respect to the constant. Indeed, taking the broader view of parameters of including algorithm logic, one can argue that many cryptographic algorithms are in this class. For a more narrowly defined, but slightly hypothetical, example in ECC, suppose that only a very few field sizes are naturally side channel-resistant (and simultaneously efficient), such as the National Institute of Standards and Technology (NIST) Prime curve 256 bits (P256) or Curve25519 field sizes.

Note that the Pohlig-Hellman (PH) attack can be considered insight-avoidable by using the complex-multiplication (CM) method of elliptic curve generation because the CM method can start with a given curve size, which can be pre-chosen to be prime. Two minor disadvantages of using the CM method are that (1) it results in a curve with a low-magnitude discriminant, which is sometimes suspected to be a security risk, and (2) it usually results in an almost random field size, which can be inefficient. If one is not willing to use the CM method, for the reasons above or otherwise, then one would not consider the PH attack to be insight-avoidable.

A third tier of attack admits a still small, but now non-negligible, fraction of exceptional values of the constant against which the attack is ineffective. We also presume in this case that the attack is quickly checkable. In this case, the attack is search-avoidable with respect to the constant because one can try random values of the constants, test them against the attack, and repeat until the attack is avoided. An example in ECC is the PH attack, which is search-avoidable with respect to curve coefficients. The usual search to resist the PH attack is to try various values of the curve coefficients, compute the curve size corresponding to the curve coefficients, and then check that the curve size is divisible by a very large prime, which renders the PH attack infeasible. For curve sizes of 256 bits, one might have to try on the order of hundred or so curves.

A fourth tier of attack is only effective for a small, but non-negligible, set of values of the constant; however, an adversary has the ability to find such constants by methods faster than random trial and error. Such an attack can be referred to as insight-attackable with respect to the constant.

Note that the PH attack can be viewed as a fourth-tier attack, insight-attackable with respect to the curve coefficients because, in some cases, an attacker can find curve coefficients in which the curve size is only divisible by very small primes, making the attack much faster than it is for random curve sizes. Therefore, although the PH attack is a third-tier attack, which is qualitatively stronger than a fourth-tier attack, it can also be regarded as a fourth-tier attack that is quantitatively stronger than a third-tier attack.

A fifth tier of attack is only effective for a small, but non-negligible, set of values of the constant. Such an attack can be referred to as search-attackable with respect to the constant. Note that one can also view the PH attack as search-attackable with respect to the curve coefficients because for a small fraction of curve coefficients, the curve order will be smooth, divisible only by very small primes, which makes the PH attack much faster than for a random curve size.

A sixth tier of attack is only effective for a negligible set of values of the constant, although the adversary has some insight to find the insecure values of the constants faster than the trial search. Such an attack can be referred to as randomly avoidable with respect to the constant. In ECC, the MOV and SASS attacks are randomly avoidable attacks with respect to the curve coefficients.

Note that the Pollard rho and PH attacks are generic group attacks; they work only by looking at the group structure and do not depend on the whole elliptic curve structure, including the underlying field. The effectiveness of the Pollard rho and Pohlig-Hellman attacks are determined by the curve size (and its factorization into primes).

In addition to the six tiers above, attacks can also be categorized into public and secret attacks. Four attacks mentioned above, Pollard rho, PH, MOV and SASS, are public attacks. Before an attack becomes public, it is a secret.

Figure 2:
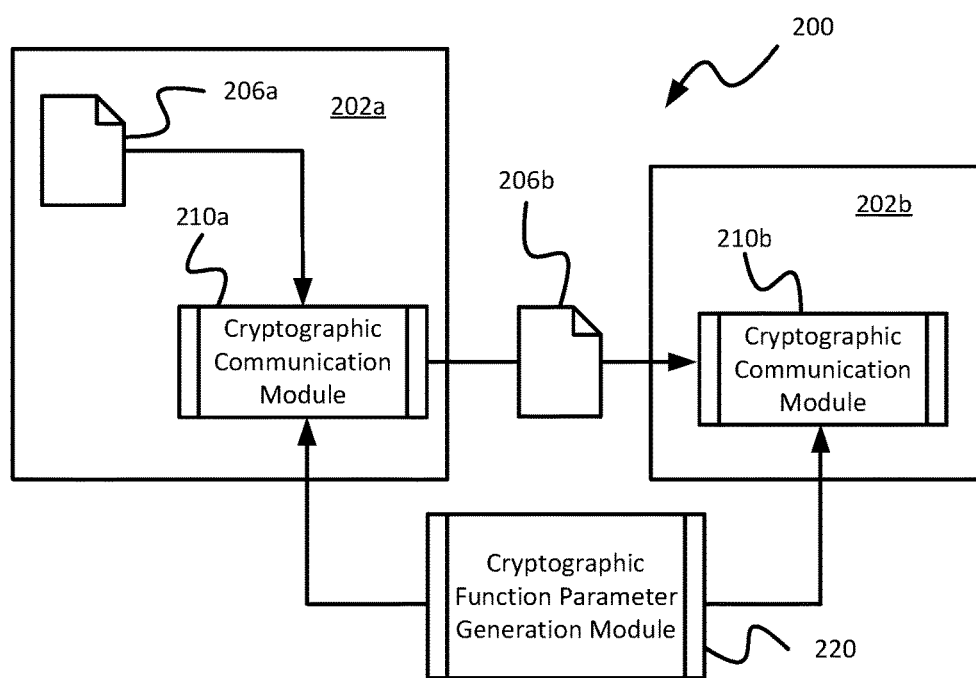
FIG. 2 is a schematic diagram showing aspects of another example cryptography system.

FIG. 2 is a schematic diagram showing aspects of an example cryptography system 200 that implements a cryptography scheme. The cryptography system 200 includes terminal modules 202a, 202b and a cryptographic function parameter generation module 220. The modules 202a, 202b, and 220 can each be implemented as computer program modules or other types of modules at one or more terminals. For example, the terminal module 202a can be implemented by the sender terminal 102a of FIG. 1, and the terminal module 202b can be implemented by the recipient terminal 102b of FIG. 1. The terminal modules 202a, 202b can be implemented by additional or different types of hardware systems, software systems, and combinations thereof.

The cryptography system 200 utilizes a cryptography scheme to allow secure communication from the terminal module 202a to the terminal module 202b. The cryptography scheme may be used for other purposes, for example, to encrypt or authenticate communications between other terminal modules. In some implementations, the cryptography system 200 uses a public key encryption scheme, a symmetric key encryption scheme, or another type of cryptographic scheme.

The terminal modules 202a, 202b communicate with each other, for example, over a data network or another type of communication link. The example terminal modules 202a, 202b can include a cryptographic communication modules 210a, 210b, respectively, and possibly other modules. The terminal module 202a can access the unencrypted or unsigned message 206a, for example, from a local memory, over a network, or in another manner. In the example shown in FIG. 2, the terminal module 202a can access an unencrypted or unsigned message 206a, generate a cryptographic object 206b (e.g., an encrypted message, digital signature, authentication tag, digital certificate, etc.), and send the cryptographic object 206b to the terminal module 202b. The terminal module 202b can receive the cryptographic object 206b from the terminal module 202a and recover all or part of the information contained in the cryptographic object 206a by decrypting or performing data authentication of the cryptographic object 206b.

In some implementations, the cryptographic function parameter generation module 220 can generate a cryptographic function parameter and provide the cryptographic function parameter to the cryptographic communication modules 202a, 202b. In some implementations, the parameters are generated by a standards body or some other third party, and the cryptographic function parameter generation module 220 can be external to (and remote from) the terminals 202. In some implementations, the terminal modules 202a, 202b can generate one or more parameters locally, and the cryptographic function parameter generation module 220 can be included in one or both of the terminal modules 202a, 202b.

The cryptographic communication module 210a can include any suitable hardware, software, firmware, or combinations thereof, operable to execute cryptographic operations. In some instances, the cryptographic communication module 210a is configured to perform data encryption. For example, the cryptographic communication module 210a may be configured to encrypt messages or other types of data based on a parameter for a cryptographic function provided by the cryptographic function parameter generator module 220. In some instances, the cryptographic communication module 210a is configured to provide data authentication. For example, the cryptographic communication module 210a may be configured to generate a digital signature or authentication tag based on a parameter for a cryptographic function provided by the cryptographic function parameter generator module 220. In some instances, the cryptographic communication module 210a is configured to generate digital certificates or other types of cryptographic objects. For example, the cryptographic communication module 210a may be configured as a certificate authority to issue digital certificates based on a parameter for a cryptographic function provided by the cryptographic function parameter generator module 220. The cryptographic communication module 210a may be configured to perform additional or different types of operations.

In some implementations, the cryptographic communication modules 210a and 210b can communicate with each other over an open channel. For example, the cryptographic communication module 210a may send cryptographic data (e.g., encrypted messages, signed messages, cryptographic certificates, public keys, key-agreement data, etc.) to the cryptographic communication module 210b over a communication channel that is observable, partially or wholly, by the adversary 112. In some instances, the cryptographic communication modules 210a and 210b can communicate over one or more data communication networks, over wireless or wired communication links, or other types of communication channels. A communication network may include, for example, a cellular network, a telecommunications network, an enterprise network, an application-specific public network, a Local Area Network (LAN), a Wide Area Network (WAN), a private network, a public network (such as the Internet), a WiFi network, a network that includes a satellite link, or another type of data communication network. Communication links may include wired or contact-based communication links, short-range wireless communication links (e.g., BLUETOOTH®, optical, NFC, etc.), or any suitable combination of these and other types of links.

Figure 3:
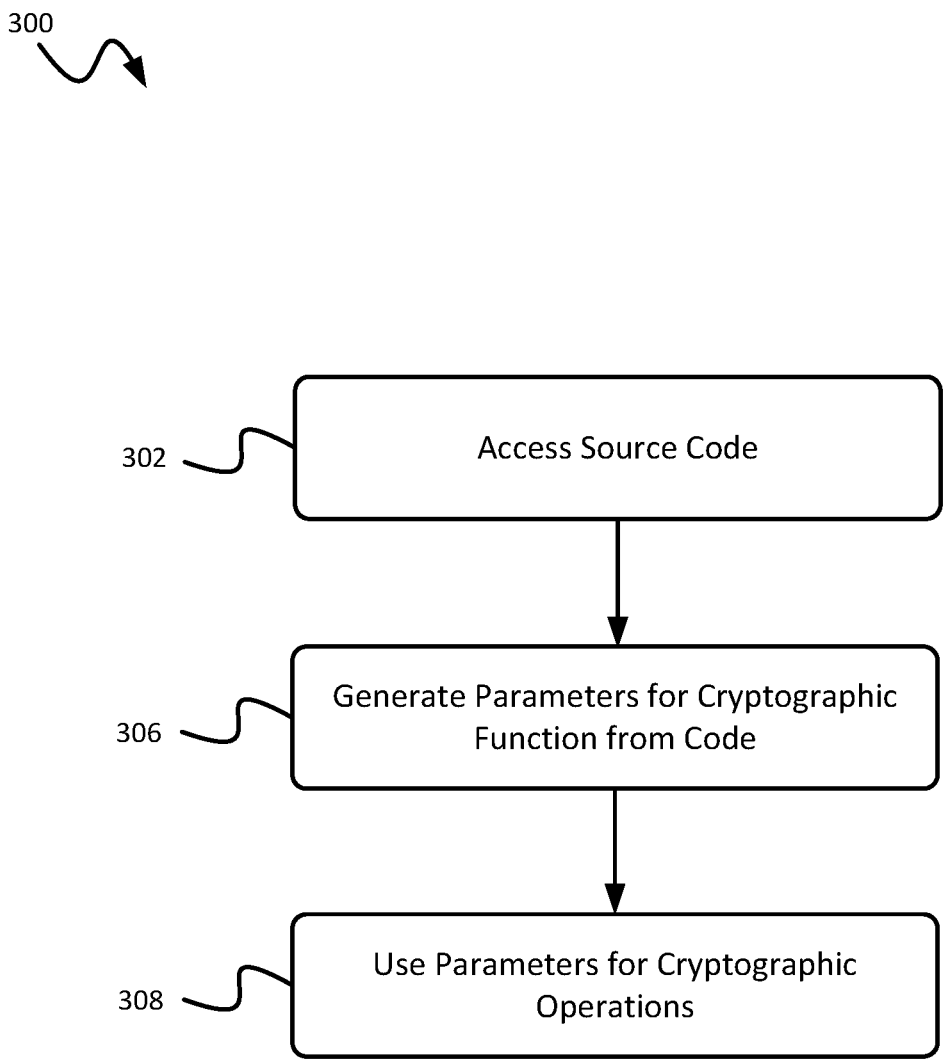
FIG. 3 is a flow chart showing aspects of an example technique for generating cryptographic function parameters using a compact source code.

FIG. 3 is a flow chart showing an example process 300 for generating cryptographic function parameters using compact source code. Some or all of the operations in the example process 300 can be performed by a user terminal, a server, by another type of computing system, or a combination of these. For example, all or part of the process 300 can be executed by the sender terminal 102a of FIG. 1 or the terminal module 202a of FIG. 2. In some implementations, some initial steps (to generate the parameters) can be performed by the cryptographic function parameter generation module 220, and the last step (using the parameters) would be performed by the terminal modules 202a, 202b. In some implementations, the process 300 is executed in a secure environment, for example, behind a firewall. The example process 300 can include additional or different operations, and the operations may be executed in the order shown or in a different order. In some implementations, one or more operations in the process 300 can be repeated or executed in an iterative fashion.

At 302, source code is accessed. In some implementations, the source code is accessed by a cryptography module of a computing system. Operations of the cryptography module can be executed by a data processor of the computing system. The cryptography module can access the source code from a memory of the computing system, from an external source, or in another manner.

In some implementations, the source code defines seed information and a pseudorandom function. The seed information can be used as an input for the pseudorandom function. In some instances, instead of pseudorandom functions (e.g., the ANSI/NIST P256 and Brainpool curves) that use standardized hash functions (e.g., SHA-1) that have their own constants (which may introduce an issue of circularity of the pseudorandomness), and especially in view of the role of pseudorandomness in preventing sixth-tier attacks (sparse attacks like MOV and SASS) as opposed to preventing fifth-tier attacks, the pseudorandom functions used in the example techniques for parameter generation (e.g., the pseudorandom functions used in the compact source code for the cryptographic algorithm parameter generation) can be called de-sparser functions so as to distinguish them and the security objectives from other pseudorandom functions and their purposes. For example, while many existing pseudorandom functions (e.g. hash functions) are expected to be collision-resistant and have two inputs, a secret key and some message, the de-sparser functions do not necessarily have two inputs. The de-sparser functions can take just one input: a seed. In some implementations, the de-sparser functions are applied to a low-entropy public input. The output of the de-sparser function can be referred to as the product.

In some implementations, the source code can be a human-readable computer code. The source code can be compiled or interpreted language (e.g., J or C programming language). For example, the source code can later be complied by a compiler program and interpreted into a machine language executable by one or more data processors. In some instances, the source code can be called a "program" or "script." The complexity of a source code can be measured, for example, based on the computation representation of a computational language (e.g., C or J programming language). For example, the complexity of a value, such as a number, can be the shortest program in the given chosen language that can return that number as its output. Example complexity measures are discussed below with respect to operation 306. In addition, the example complexity measure for J programming language is described below after FIG. 5.

At 306, a parameter for a cryptographic function is generated from the source code. In some implementations, generating the parameter includes deriving the parameter from one or more outputs produced by operating the pseudorandom function after it has been seeded by the seed information. In some implementations, the output of the pseudorandom function can be subject to precisely defined and justified criteria to obtain a suitable algorithm constant for a cryptographic function.

In some implementations, the cryptographic function includes an elliptic curve function, and the parameter includes a constant for the elliptic curve function. The parameter can be or include, for example, the field of definition of the elliptic curve, the curve coefficients a and b in the elliptic curve definition $y^2=x^3+ax+b$, the generator G of the elliptic group with respect to which public keys, and others. Other examples of parameters for cryptographic functions include the initial value and round constants in SHA-1, the round constants in AES, the exponent in RSA cryptosystems (with $2^{16}+1$ being commonly used), and the two points P and Q in the Dual Elliptic Curve (EC) DRBG. Although the example techniques in this disclosure are discussed with respect to elliptic curves, they can be applied to generate parameters for other cryptographic functions as well.

In some implementations, a specification can be used to fully or precisely specify objective function, the feasible constraint, or a combination of these and other criteria or attributes for the parameters. For example, the specification can fully specify a pool of candidate parameters, together with a security and efficiency rationale defining the boundaries of the pool; a well-defined objective function (set) to optimize, such as, from most ideally to least ideally, one or more of a well-defined security metric (e.g., degree of resistance to known attacks, or strength of provable security), a well-defined complexity metric (discussed below), a well-defined efficiency metric, or a combination thereof in the given priority; and auxiliary information, such as, the pseudorandom function, seed, and customization inputs (if any), and any pool from which the parameters of the pseudorandom function can be drawn. An example criteria of the specification can be: "the parameter has shortest length source code written in J programming language."

In some implementations, to reduce the risk of curve manipulation, the (Kolmogorov) complexity of the source code can be optimized by minimizing it. The various aspects of the constants can have their complexity measured. Some example complexity measures include code length in some standard programming language, like J or C programming language, code length in some model of arithmetic computations such as straight line programs, code length in one of the three fundamental computing abstractions (Universal Turing Machine, Lambda Calculus, and Partial Recursive Functions), and compressibility under some standard compression algorithm.

In some implementations, the parameter generation requires specification of a candidate set of parameters. In the case of complicated parameter sets, such as sets of elliptic curves, the complexity measures based on fundamental computing principles, such as lambda calculus, may result in very high complexities. In some implementations, more mathematically oriented complexity measures may be needed. For example, using a complexity measure that has arbitrary-sized integers as atomic objects rather than, say, bits would probably help to reduce the complexity of prime-field elliptic curve constants to a level that would reduce or remove the problems resulting from complexity measures based on fundamental computing principles. The more mathematically oriented complexity measures can reduce the possibility of manipulation.

In some implementations, even the complexity measures of the complexity measures need to be considered because the choice of complexity measure itself can be manipulated. Furthermore, manipulating the complexity measure has an extra degree of separation from direct manipulation of the algorithm constants themselves. This extra degree of separation makes a manipulation considerably more costly. In some implementations, the amount of manipulation possible in the complexity measure can also be accounted for by enumerating a set of complexity measures. For example, there are only a finite number of computer languages currently available to account for the amount of possible manipulation.

Some testable criteria can be specified for the de-sparser function (e.g., the pseudorandom used for parameter generation). The de-sparser function can have a minimal-complexity specification, subject to these criteria. The two main security goals for the de-sparser function are pseudorandomness and incompressibility.

As to pseudorandomness, if the de-sparser function is given a high enough entropy input seed, the output is computationally indistinguishable from a uniform value in the target range. To test and disprove this condition, it requires a high-entropy, efficiently sample-able distribution and a practical algorithm that reliably distinguishes the function output from elements drawn uniformly at random from range of the de-sparser function. (Formally, the range means co-domain, not image. So, the range of the de-sparser function must be explicitly defined. In practice, the range typically includes integers in a given interval.) When claiming this form of pseudorandomness, the amount of entropy for the input seed needs to be specified before the product output can be considered indistinguishable from uniformly random.

As to incompressibility, it could be computationally infeasible to find low complexity input x such that function $f$ output $y=f(x)$ has a description z of lower complexity than the description $f(x)$. To claim incompressibility, the complexity measure needs to be specified, and the cut-off threshold (e.g., upper bound) for the complexity of x needs to be specified.

Both of the conditions above are falsifiable conditions, not abstract assumptions. The falsifiability can potentially help to decide between pseudorandom functions. If the conditions were not falsifiable, then one could reject functions based on imprecise implausibility.

In some applications of the de-sparser functions, such as where a portion of the input seed to the de-sparser function is either random or not subject to the control of an attacker, a milder goal of non-lossiness may suffice.

As to non-lossiness, if the input has high enough entropy, the output has high entropy. Non-lossiness is a testable condition. A disproof of non-lossiness is a demonstration of a high-entropy input distribution whose output distribution has low entropy, where the thresholds for high and low entropy are quantities determined in advance defining the parameters of non-lossiness. Generally, collision resistance implies non-lossiness, but collision resistance is not strictly necessary for non-lossiness.

The importance of considering the non-lossiness condition is that it is a more plausible condition and can be contemplated separately where appropriate. Its greater plausibility can lead to greater assurance against the possibility of manipulation.

As such, in some implementations, the generated parameter for a cryptographic function can have a larger size in memory than the source code that defines the seed information and the pseudorandom function (e.g., the de-sparser function). The size in memory of information can refer to the amount of memory (e.g., the number of bytes, megabytes, etc.) that is needed to store the information. In some implementations, the source code includes the minimal size source code for generating the parameter for the cryptographic function. For instance, the source code can have the minimum size according to one or more of the complexity measures discussed herein to describe the seed information and the de-sparser function. As an example, the source code can be written in J programming language and have a minimum complexity. The source code can be compact and incompressible, or non-lossy so that not much freedom is left for manipulation of the de-sparser function.

In some implementations, a full set of parameters for the cryptographic function can be generated from the source code. The full set of parameters can have a larger size in memory than the source code that defines the seed information and the de-sparser function, and the source code includes an incompressible code for generating a full set of parameters for the cryptographic function. The source code can be considered incompressible, for example, when the size of the source code cannot be reduced further by compression or other techniques.

At 308, the parameter is used to perform cryptographic operations, such as encrypting or decrypting for confidentiality and generating or verifying a signature for authenticity. In some implementations, the parameter is used to perform cryptographic operations according to a cryptographic communication protocol. For example, the parameter can be used to perform cryptographic operations by the cryptographic communication modules 210*a* described with respect to FIG. 2, or in another manner.

In some implementations, to hinder manipulation, a resource-intensive function can be used for generating cryptographic function parameters. This approach can reduce the possibility that malicious parameters have been obtained through trial and error by rendering each trial more costly. For example, a resource-intensifier can be applied before the de-sparser function to avoid interfering with the pseudorandomness goals of the de-sparser function. As an example, an elliptic curve discrete logarithm problem can be used as a puzzle to establish the trustworthiness of an elliptic curve. The elliptic curve can be defined over which the puzzle is defined to be derived from the output of the de-sparser function, then a puzzle whose hardness is not easily manipulable can be obtained.

Figure 4:
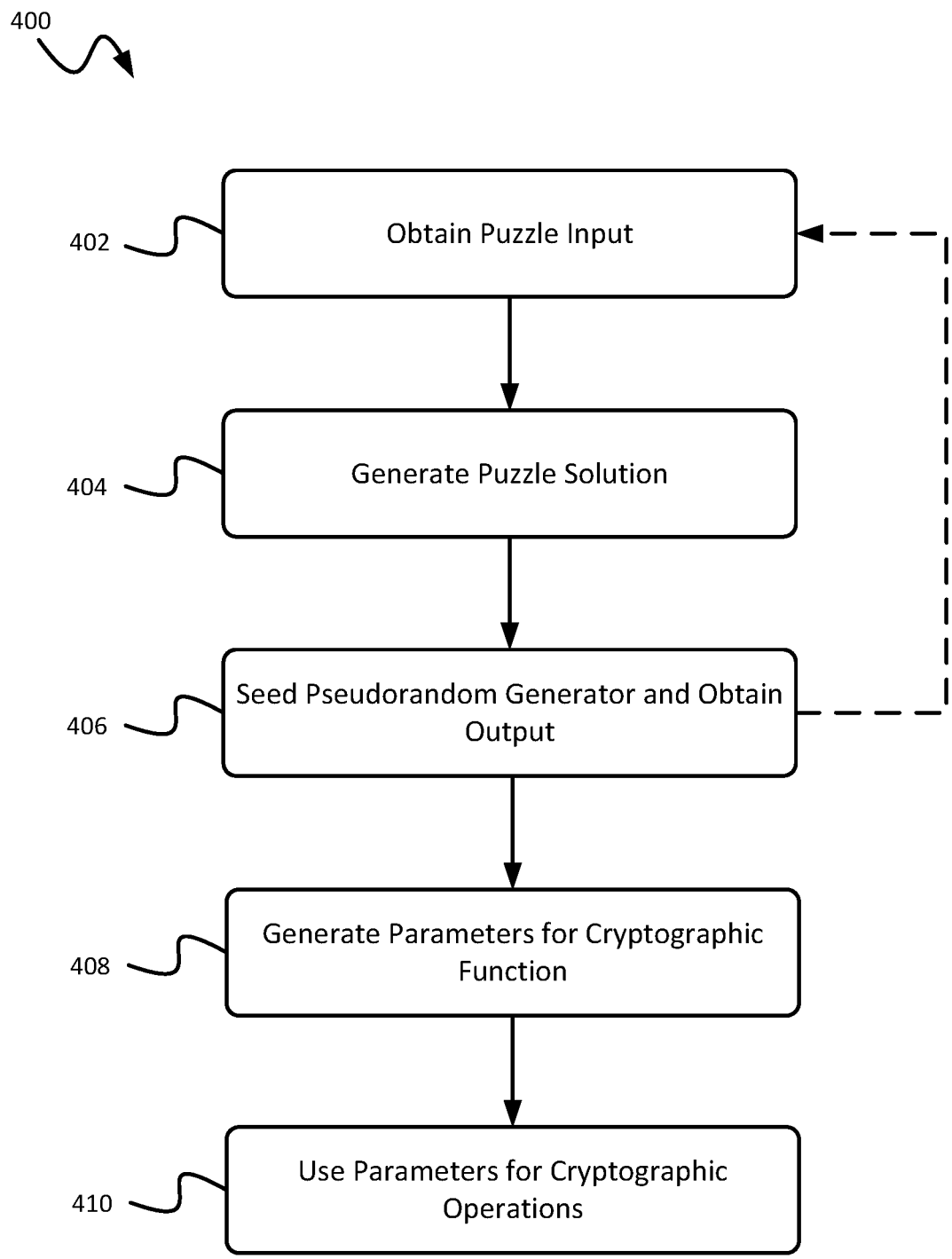
FIG. 4 is a flow chart showing aspects of an example technique for generating cryptographic function parameters using puzzle-based algorithms.

FIG. 4 is a flow chart showing an example process 400 for generating cryptographic function parameters using puzzle-based algorithms. Some or all of the operations in the example process 400 can be performed by a user terminal, a server, by another type of computing system, or a combination of these. For example, all or part of the process 400 can be executed by the sender terminal 102*a* of FIG. 1 or the terminal module 202*a* of FIG. 2. In some implementations, some initial steps (to generate the parameters) can be performed by the cryptographic function parameter generation module 220, and the last step (using the parameters) would be performed by the terminal modules 202*a*, 202*b*. In some implementations, the process 400 is executed in a secure environment, for example, behind a firewall. The example process 400 can include additional or different operations, and the operations may be executed in the order shown or in a different order. In some implementations, one or more operations in the process 400 can be repeated or executed in an iterative fashion.

At 402, a puzzle input is obtained. In some instances, the puzzle can be or include a "hard problem" (e.g., NP-hard problem) that is feasible but requires significant computational resources to solve, and the solution can be verified with fewer computational resources. For example, the solution may be verified hundreds or millions of times faster than it is generated using the same hardware. In some implementations, the puzzle input can include, for example, an output product of a de-sparser function, or another input to seed the puzzle function. As an example, an output product of a de-sparser function can be used to define a small "puzzle" elliptic curve, say of size 60 bits, together a pair of pseudorandom points on this curve, say P and Q. Then, the discrete logarithm of Q to the base P can be computed.

At 404, a solution to a puzzle is generated. In some implementations, the solution to the puzzle can be obtained by applying a puzzle function to the puzzle input. Generating the puzzle solution has a higher computational cost than verifying the puzzle solution.

At 406, a pseudorandom generator is seeded based on the solution. After seeding the pseudorandom generator, an output from the pseudorandom generator is obtained. In some implementations, the pseudorandom generator can be a pseudorandom function (e.g., the de-sparser functions described above with respect to FIG. 3); or can include additional or different pseudorandom functions such as those that could be implemented as hardware. In some implementations, the pseudorandom generator can be built using a pseudorandom function. For example, a pseudorandom generator R can keep a state s and have a "next" function and a "refresh" function. When the "next" function is invoked, the pseudorandom generator outputs a random output value based on the current state of the pseudorandom generator and updates the state parameter to a new state. The "next function" can be represented $(r, s') \leftarrow R.next(s)$, where r is the random output value and s is the current state of the pseudorandom generator that is replaced by the new state s'. A pseudorandom generator can include additional or different functions. In some implementations, a pseudorandom function can be implemented by a pseudorandom generator. For example, a variable-output-length pseudorandom function can be built from a pseudorandom generator using multiple calls to ".next," each ".next" call involving a fixed-length pseudorandom function that does not keep a state nor remember previous outputs.

In some cases, one or more of the operations 402, 404, and 406 can be combined into an iteration of an example iterative process. For example, each iteration can include generating a puzzle solution for the iteration by applying the puzzle function to a puzzle input for the iteration, seeding the pseudorandom generator based on the puzzle solution for the iteration, and then obtaining from the pseudorandom generator an output for the iteration. In some cases, the puzzle input one or more of the iterations is based on the output for a prior iteration.

As an example, due to the possibility that the seed of the de-sparser has been manipulated in order to make the Elliptic Curve Discrete Logarithm Problem (ECDLP) on the puzzle curve easy, the operations 402, 404, and 406 can be iterated by taking the puzzle solution and the discrete log and generating yet another puzzle instance. This second puzzle can be yet harder to manipulate because the adversary had to manipulate the original seed to get the first puzzle to be easy. By iterating a few more times, the difficulty of the puzzles can be amplified. In some implementations, formally proving that this amplification occurs may require the assumption of the pseudorandomness of the de-sparser function, the pseudorandomness of the discrete logs of random points on random curves, and the cost of the ECDLP on the puzzle-sized elliptic curves.

At 408, a parameter for a cryptographic function is obtained based on the output from the pseudorandom generator. In some implementations, obtaining the parameter includes deriving the parameter from one or more outputs produced by operating the pseudorandom generator seeded by the solution. In some implementations, a full set of parameters for the cryptographic function can be generated from the output from the pseudorandom generator. The operation at 408 can be similar to or different from the operation 306 of the example process 300. For example, the cryptographic function can include an elliptic curve function, and the parameter can include a constant for the elliptic curve function.

In some instances, the above operations can ensure that generating a candidate constant (e.g., a candidate curve) would require a large but feasible amount of computation.

Such a large amount of computation can help prevent manipulation. In some implementations, for this puzzle-based method, only the sequence of puzzle solutions needs to be recorded to be ensure quickly verifying correct derivation of the candidates from the seed.

At 410, the parameter is used to perform cryptographic operations, such as encrypting or decrypting for confidentiality and generating or verifying a signature for authenticity. The operation at 410 can be similar to or different from the operation 308 of the example process 300. For example, the parameter can be used to perform cryptographic operations according to a cryptographic communication protocol.

In some implementations, to the reduce reliance on the pseudorandom function, some actual randomness can be incorporated into the seed value. This would be an instance of the principle of defense in depth, or avoiding a single point of failure. Furthermore, the unpredictability of the random sources may help reduce the opportunity for an adversary to manipulate other parameters of the algorithm, including the very pseudorandom function itself.

In some implementations, when using a pseudorandom function with an input that is derived from a true source of randomness, it is needed to assess the lossiness of the pseudorandom function. In most cases, the lossiness implies collisions. In particular, if the pseudorandom function is collision-resistant, in that nobody can find collisions, then it is quite plausibly non-lossy.

In some implementations, an easily and globally verifiable and non-manipulable random source can be used to introduce randomness into the seed value. Most natural, true random sources have some natural biases and are not uniformly distributed values in a range. This bias will typically be reduced or eliminated when feeding the input to the pseudorandom function. Therefore, the amount of entropy in the random source, how difficult this is to manipulate, and how easy it is to verify are the main concerns of some example approaches of incorporating random source into the seed values. As an example, astronomical events (e.g., sunspots, supernovas, etc.) can be used as the random source to introduce randomness into the seed value.

In some implementations, if large quantities of verifiable randomness are desired, then many other astronomical and non-astronomical events might be useful (though less convenient than sunspots and more ephemeral than that supernova and meteoroids). On earth, major seismic events, such as earthquakes, can sometimes be measured at great distances across the earth, and these characteristics may be useful as randomness sources. On other planets, large-scale sandstorms on Mars and cloud formations on Jupiter as imaged from earth-based telescopes are example random sources.

Figure 5:
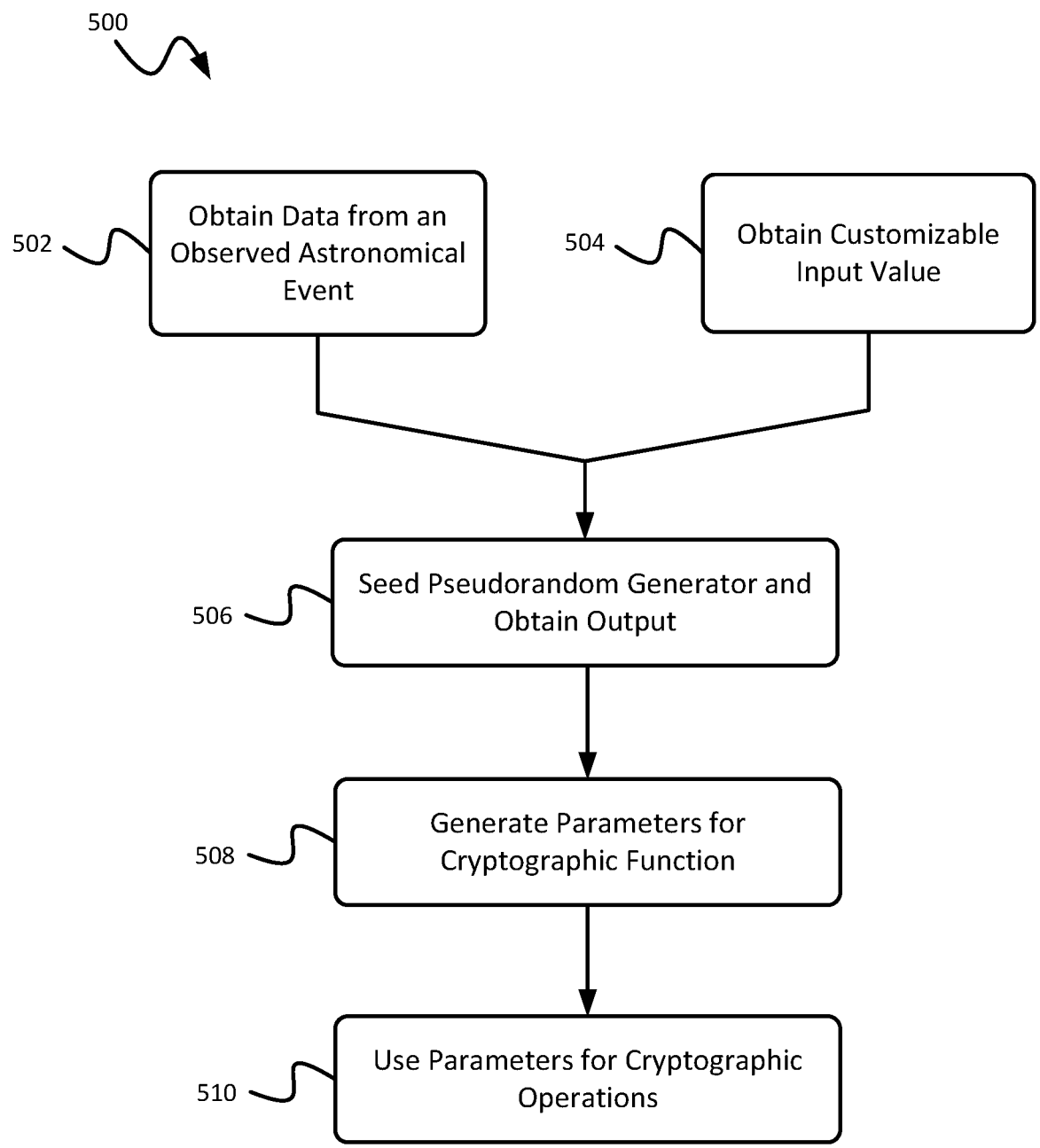
FIG. 5 is a flow chart showing aspects of an example technique for generating cryptographic function parameters based on astronomical events.

FIG. 5 is a flow chart showing an example process 500 for generating cryptographic function parameters based on astronomical events. Some or all of the operations in the example process 500 can be performed by a user terminal, a server, by another type of computing system, or a combination of these. For example, all or part of the process 500 can be executed by the sender terminal 102a of FIG. 1 or the terminal module 202a of FIG. 2. In some implementations, some initial steps (to generate the parameters) can be performed by the cryptographic function parameter generation module 220, and the last step (using the parameters) would be performed by the terminal modules 202a, 202b. In some implementations, the process 500 is executed in a secure environment, for example, behind a firewall. The example process 500 can include additional or different operations, and the operations may be executed in the order shown or in a different order. In some implementations, one or more operations in the process 500 can be repeated or executed in an iterative fashion.

At 502, astronomical data from an observed astronomical event is obtained. The observed astronomical event can include an event that is globally observable and globally verifiable. For example, the observed astronomical event can include a sunspot (e.g., the sunspot pattern at a pre-prescribed set of one or more past, current, or future dates), and obtaining the astronomical data can include computing the astronomical data based on an attribute of the sunspot. Generally, sunspot prediction seems to be difficult in that solar storms do not yet have accurate long-term forecasts. Sunspot patterns are globally verifiable, using some modest astronomical equipment: a telescope, a camera, a filter, and so on. In practice, a standard image of the sun may be distributed across the internet, and users can verify the image locally and directly using rather basic astronomical equipment.

In some implementations, the sun can be measured on the autumn and spring equinoxes because at these times of the year, the sun is visible from all parts of the earth. One of these equinoxes may be preferable in terms of average global cloud cover. Note that the sun takes 25 days to rotate, which gives a many-day window to observe sunspots to accommodate cloudy days. If this is used, then the sunspots near the limb can be ignored, and that rotation should be accounted for. Also, variations in sunspot patterns that are expected to occur within this window can also be discounted.

An alternative time to measure the sun is at astronomical noon the two days a year that the sun's rotational axis is coplanar with the earth's rotational axis. This timing has the advantage that orienting the images of the sun should be easiest because the sun's rotational axis will appear close to vertical to all earth observers. As long as these two times permit easy viewing for most of the parts of earth (that is, they are not too close to a solstice), then this may be acceptable.

Generally, sunspots will eventually fade. So, after enough time past the observation date, they will no longer be verifiable. Therefore, new future users will no longer be able to directly verify the randomness. Two example remedies to this are renewal and record keeping. In record keeping, daily images of the sun are published and archived by various entities, for example, in a library, that users can cross-check and so on. In renewal, the elliptic curve can be updated periodically, say once a year, so that new users can check the curve themselves within year.

Compared to sunspots, some other astronomical events can leave a longer lasting record for verification but may require more expensive astronomical equipment. For example, the observed astronomical event can include a supernova, and obtaining the astronomical data can include computing the astronomical data based on an attribute of the supernova. Supernova occur sporadically but moderately often in nearby galaxies. A supernova is often bright for many days, and afterwards leaves an even longer lasting remnant (such as neutron star and nebula) that may be detectable with advanced astronomical equipment. The position of the supernova and its remnant can be quite stable. This position may, therefore, provide a physical record.

As another example, the observed astronomical event can include a meteoroid discovery, and obtaining the astronomical data can include computing the astronomical data based on an attribute of the meteoroid. Small meteoroids that are difficult to observe from large distance sporadically pass close to the earth. Once these are observed, their trajectories may be calculated, and then they can subsequently be tracked once they pass the earth because once one has the correct trajectory data, observation at greater distances may be feasible. In some instances, over time, it may be able to find more and more such meteoroids at greater distances; each new discovery can be viewed as a random event.

As another example, the observed astronomical event can include an event on an extraterrestrial planet (e.g., sandstorm on Mars, cloud formation on Jupiter, etc.), and obtaining the astronomical data can include computing the astronomical data based on an attribute of the event. The attribute of the event can relate to, for instance, the location, timing, duration, physical extent or magnitude of the event, or a combination of these. The astronomical event can be associated with any extraterrestrial body (e.g., a moon, a planet, etc.) or formation associated with any extraterritorial planet (e.g., Mercury, Venus, Mars, Jupiter, Saturn, Uranus, Neptune, Pluto, or extrasolar planets).

At 504, a customized input value for the cryptographic function is obtained. The customized input value can include one or more user-selected input values, for example, an alphanumeric value received from an individual user or group of users. The customized input values can be used to generate customized cryptographic parameters, for example, based on a user-selected input value, the astronomical data, other factors, or a combination of these. In some implementations, customizable elliptic curve generation allows a smaller set of users to use the same generation method but obtain different parameters. The benefits of customizability may include, for example, enhanced security and reduction of the trust of the generation method itself. For example, some attack algorithms cannot be amortized across multiple parameters. That is, an attacker may have to restart the attack for each new set of parameters. In that respect, using different parameters can boost security per user. As for reducing the trust on the generation method itself, particularly, the randomness of generation method depends less on the pseudorandomness and more on the non-lossiness of the pseudorandom function.

In some implementations, customizability can be used in a time-based fashion (e.g., refreshing in real time, periodically, or from time to time). Customizability can be used, in some cases, for a degree of accountability by identifying the parties who generated the curve. Customizability can be used, in some cases, to avoid shared constants between different-purpose algorithms, to avoid potential bad interactions, etc. Customizability can be used in additional or different applications.

At 506, a pseudorandom generator is seeded based on the astronomical data, the customized input values, or a combination of these and other inputs, and after seeding the pseudorandom generator, an output from the pseudorandom generator is obtained. In some implementations, the astronomical event and the pseudorandom generator are specified by a cryptosystem protocol, and the cryptosystem protocol permits a range of values for the customized (e.g., user-selected) input value. The pseudorandom generator here can be seeded or otherwise operated in a similar manner as the operation 406 of FIG. 4, or it can include additional or different pseudorandom functions and be operated in different manner.

At 508, a parameter for a cryptographic function is obtained based on the output from the pseudorandom generator. In some implementations, a full set of parameters for the cryptographic function can be generated from the output from the pseudorandom generator. In some implementations, obtaining the parameter includes deriving the parameter from one or more outputs produced by operating the pseudorandom generator seeded by the solution. In some implementations, a full set of parameters for the cryptographic function can be generated from the output from the pseudorandom generator. The operation at 508 can be similar to or different from the operation 306 of the example process 300 or the operation 408 of the example process 400. For example, the cryptographic function can include an elliptic curve function, and the parameter can include a constant for the elliptic curve function.

At 510, the parameter is used to perform cryptographic operations, such as encrypting or decrypting for confidentiality and generating or verifying a signature for authenticity. The operation at 510 can be similar to or different from the operation 308 of the example process 300 or the operation 408 of the example process 400. For example, the parameter can be used to perform cryptographic operations according to a cryptographic communication protocol.

The techniques described above with respect to FIGS. 3, 4 and 5 can be combined with each other or with other techniques for generating cryptographic function parameters.

In some instances, improvements on rules committee, objective competition, and universal constant generation method are provided. Most existing cryptographic algorithms, particularly in regard to their constants, have three typical origins: proprietary proposition (including academia, open source, private company, and government); open-submission competition, with authoritative judges and committee negotiation; and consensus and ballot. Such processes can potentially be complicated, biased, and subverted or at least be accused of such problems.

The following improvements to the procedures above may reduce the possibility of subversion. A rules committee can develop and maintain a set of objective competition rules. Although committees can be biased and thereby influence the rules, the rules can be objective, offering a degree of separation from the outcome of the competition. The rules can aim for simplicity and feasibility. In other words, the committee can determine a set of requirements (a well-known idea), but the requirements can described in a fully programmatic and mathematical fashion. The rules can be objective and easily verifiable. Any proposal can be possible for anybody to judge: any constant generation/verification method can be judged by the same set of rules. In some implementations, a constant generation method can generate all kinds of constants, including ECC coefficients, DH and DL parameters, hash initial values and round constants, and block cipher round constant. Moreover, proposal submission may be open to anybody.

The scope of this process can be limited to clearly-defined constants, not to judge general algorithms. Algorithm designers and users can separate the selection of constants from the algorithm. They can peruse the list of proposals in the competition, apply the rules to select the best proposal, and apply the method. In other words, a committee need not decide the best method, but rather maintain a list of submissions and rules, permitting a user to access this information and determine (or confirm) the best constants from the rules and submissions.

In the following, the J programming language is used as an example for illustrating a complexity measure of a source code. To start, some examples of representing positive integers in the J programming language are provided. Integers of a size around $2^{256}$ are considered because the size is of greatest interest to elliptic curve cryptography. First, consider the field size of the NIST elliptic curve P256. In J, this integer can be specified in 17 characters (including four spaces) as:

−/2x^32*8 7 6 0 3

To interpret this J expression, from the right to the left, the sequence 8 7 6 0 3 represents an array of five integers. Then, 32*8 7 6 0 3 means to multiply each array entry by 32, resulting in 256 224 192 0 96, another array. The value 2x means the integer 2 with arbitrary precision (rather than just the default precision of the computer hardware). The arbitrary precision will be used in the next step. The operator ^ means exponentiation, so 2x^32*8 7 6 0 3 results in the array with entries $2^{256}$, $2^{224}$, $2^{192}$, 1, and $2^{96}$ (in that order). The J expression −/ means to insert a subtraction operation between each element of the array. In J, all operators have right-precedence in the sense they are evaluated from right to left. So the result of the above is:

$(2^{256}-(2^{224}-(2^{192}-(1-2^{96}))))$

J then evaluates this expression.

Next, how this expression relates to the NIST P256 prime value is shown below. The nested subtractions can be replaced by non-nested alternating subtractions and additions, as follows:

$2^{256}-2^{224}+2^{192}-1+2^{96}$

Then, one just re-arranges the order of terms to get the usual representation of the NIST P256 field size:

$2^{256}-2^{224}+2^{192}+2^{96}-1$

There are other ways to express this same integer in the J programming language. For example, one can write its normal decimal expansion as:

115792089210356248762697446949407573530086143415290314195 53363130886709785395 1x

The final x indicates that the integer is to be treated as a multi-precision integer. (Without the x, entering the decimal expansion will cause rounding to floating-point number, which loses many of the least significant digits, no longer resulting in a prime number.) This J expression requires 79 characters, which is considerably longer than the 17 characters for our first J expression.

The shortest J representation of a value is of interest. A simple alternative to the decimal expansion can be considered by increasing the size of the radix (also known as base) from ten to a larger value, which reduces the number of digits needed.

The J language allows integers to be entered in radices (bases) up to 36, by using lowercase letters instead of decimal digits to represent radix entries (digits) from 0 to 35. To use these alternative radices, one has to prefix the representation with the radix (in decimal) and then enter the letter b (for base, another term for radix). In order to avoid floating-point conversion, one cannot terminate the representation with x (which we could do with the decimal representation) because that could now be confused with a digit. Instead, one can prefix the string with "x:", which applies a conversion function that forces its inputs to retain arbitrary precision. Thus, the NIST P256 prime field size can be represented in J using the 55 characters:

x:36b6dp5qc7tnj0m0gazijnpmwo1vwe5o45gjk1szj59vqctqekoov

An even larger radix can also be used. For example, radix 95 can be considered because the number of visible (and easily type-able) ASCII characters is 95. In this example, start with the J expression:

95x p.~32−~a.i.'q:+_ReiVjjlgGl?:
    8Wn.4\c}54$xlF%CQco+>q' where the characters between the single quotes ('q:+_Re: iVjjlgGl?:8Wn.4\c}54$xlF%CQco+>q') are treated as strings, which represents an array of ASCII characters. The a.i. converts the string to an array of integers representing the ASCII codes of characters in the string. The 32−~expression subtracts 32 from each integer: 32 is the smallest ASCII code (for space) of a visible character. The 95x p. expression treat the array of integers as the base 95 representation of a big integer and results in the value of that integer.

The reason that that radix 95 expression is longer than the radix 36 expression is the greater overhead in getting J to do the extra processing that is not built-in (as it is for radix 36). The actual number of radix entries (digits) is fewer for radix 95.

In addition, any similarly sized integers can be expected to have a J specification of similar size, whether it uses radix 36 or radix 95. For larger integers, the radix 95 representation could be shorter than the radix 36 because the overheads remain the same.

For J programs specified in ASCII characters, a radix 95 expansion can be regarded as nearly optimal, in the sense of being shortest, for most large integers. In some instances, better ways to write a base 95 expansion are possible with a shorter overhead code than the code above.

For J implementations in different languages, a larger set of characters may be available, allowing for a yet shorter representation. The overhead for the radix 95 expression above is 17 characters, so it would necessarily be longer than the first 17 character expression.

As such, the above examples show how compactly J language can represent an integer and how the NIST P256 prime field size is objectively compact compared to a typical integer of its size, consuming 17 characters instead of 55 characters.

One feature of J programming language is that it provides an objective way to demonstrate that NIST P256 field size is a special number in the sense of having a lower complexity measure than numbers of greater size. For example, conventional mathematical notation can demonstrate this special nature. For instance, if writing the NIST special prime as:

2^256−2^224+2^192+2^96−1 then 28 characters are used instead of 78 provided by the decimal expansion (which is also allowed under the most conventional mathematical notations). As such, the compactness of the J language can specify more complicated numbers in a random-appearing yet compact manner.

As with most other programming languages, a J program can be parsed into tokens. In J, the tokens are classified into several groups, the most important of which called are nouns, verbs, adverbs, and conjunctions (named after terms from the syntax of English, but with different meanings in J). For example, nouns can include numbers, arrays, and strings. Strings are arrays of characters and can be defined by entering characters between two single quotes. The variable a. in the radix 95 expression above holds a string of all characters used in the J implementation, which includes all the ASCII characters, of which only 95 can be easily typed into a program.

Verbs can include, for example:

^ −x. p. i.

that perform multiplication, exponentiation, subtraction, contraction, conversion, polynomial evaluation, and indexing, respectively. Verbs take nouns as inputs, sometimes just one noun on the right, and sometimes two nouns, one on each side. Verbs, when evaluated, produce another noun as an output.

Verbs are not very unusual in terms of syntax, with a syntax corresponding to what are called operators in the C programming language. However, verbs can be user-defined and even tacitly defined, which is different from C. In C, and many other languages with similar syntax, programmers can define a function f, but it always has the syntax f(i1, i2, . . . ), where i1 and i2 and so on are the inputs, whereas in J, there are at most two inputs, and it is written i1 f i2. In J, all verbs have equal precedence, and the rightmost verbs in an expression are evaluated first.

Example adverbs shown above include:

/~

An adverb takes as input one verb, which is always on the left, and outputs another verb. Then, the output verb itself can be evaluated, taking as inputs a noun. So the expression −/ takes the verb − and modifies it to produce a new verb, which, when applied to array on the right, inserts a subtract verb between each entry in the array. The adverb ~ can be used to switch the left and right inputs to a verb, so a−~b will evaluate to the same value as b−a. The result of applying an adverb to a verb is called a tacit, or implicit, verb definition because the resulting verb is not defined explicitly in terms of its input variables. Such tacit definitions of verbs make J unusual compared to other languages, but also make it compact, which is useful for the example parameter generating techniques described herein.

In some implementations, adverbs can also, and commonly do, take nouns as inputs. Adverbs usually output verbs, but are allowed to output other parts of speech. Conjunctions are similar to adverbs, but take two inputs, one on the left and one on the right. When conjunctions are supplied with only one input, they output an adverb, which expects the other input of the conjunction, always on the left, whether or not the conjunction was supplied its left input or right input. Such an adverb is a tacitly defined adverb.

Take a more complicated J program as an example. The J program example below can be used to implement a useful pseudorandom function F. The J program is:

(&|)(@(2 3 5&^)(+/@)(^:7)

This J program defines an adverb. So, to apply this program, an argument needs to be supplied to the left, which is intended to a prime number for the example techniques described in this disclosure. The result of applying the adverb to its argument is a verb, taking on argument on the right, which is intended to be a small non-negative integer, such as zero.

This adverb is a train of four smaller tacitly defined adverbs, each enclosed in a pair of matching parentheses. Adverbs in a train are applied from left to right. &| is the first adverb in the train. It will receive the input of the field size p and output a verb that reduces integers modulo p. The conjunction & here is used to bond a noun to a verb, to produce another verb in which one of the inputs is fixed, in a process called currying. The verb | computes modular reduction for multi-precision integers.

@(2 3 5&^) is the second adverb in the train. The sub-expression 2 3 5&^ is a tacitly defined J verb that on integer input x outputs an array $2^x$ $3^x$ $5^x$. The conjunction @ is called composition and composes this verb with previous verb, which reduces integers modulo p. So, the first two adverbs, when applied top, return a verb that maps an integer x to an array ($2^x$ mod p) ($3^x$ mod p) ($5^x$ mod p).

+/@ is the third adverb in the train. It composes the previous verb with the summation verb +/, producing the verb that maps integer x to ($2^x$ mod p)+($3^x$ mod p)+($5^x$ mod p).

^:7 is the fourth adverb in the train. It modifies the previous verb by iterating it seven times, giving a J verb which computes the function F.

The output of this J adverb is a verb, with one argument on the right, which is the index m, the input to our function F. So F(0), without the final modular reduction, can be specified in J as:

$$p\ F\ 0$$

In the short program above, the J noun p should have previously been defined as the value of the prime under consideration, such as in p=:−/2x^32*8 7 6 0 3, or else p could be replaced by a parenthesized expression (−/2x^32*8 7 6 0 3), and F could be replaced by the previous program, or else have previously executed an assignment of the form:

F=:(&|)(@(2 3 5&^)(+/@)(^:7)

The utility of the resulting function and the utility of specifying a short J program for the function will be discussed below with respect to the examples.

For a first example, consider modifying Curve25519 by replacing its main parameter coefficient A by a pseudorandom value. Recall that, currently, A is chosen as the minimal value meeting certain constraints for the elliptic curve $y^2=x^3+Ax^2+x$ defined over the field of size $2^{255}-19$. The current value A can be replaced by another value Z=F(m), where F is a function to be determined below, and m is the minimal non-negative integer such that F(m) meets the constraints on the elliptic curve $y^2=x^3+Zx^2+x$ defined over the field of size $p=2^{255}-19$.

F can be an example compact pseudorandom function described with respect to example process 300. Both the compactness (incompressibility) and pseudorandomness of F as a function need to be testable, and this will be defined in a manner described below.

In addition, the complexity of expressing Z as F(m) is minimal in the sense that it is more compact than expressing Z in its more natural radix (binary, decimal, or any base) expansion, under the given complexity metric.

Note that the effective value of Z will be Z mod p. In some implementations, since all Zs require reduction mod p to determine their effective value, the cost of mod p can be ignored in measuring the complexity.

An existing programming language can be used to specify F, but for an accurate measure of the complexity, the choice of programming language can be added into the measure of the complexity F. For simplicity, a simple character count of the language specification can be used as the complexity measure. If one refers to the Rosetta code web site, one finds about 1000 computer languages. Allowing for different versions for each language, this adds a cost of approximately two bytes, say sixteen bits, to represent the language.

In some implementations, the J programming language can be chosen for a few reasons. It has a compact syntax and a large but tersely named set of simple but powerful built-in primitive functions. In particular, it allows specification of a diversity of complicated functions using very few characters. This level of compactness may also be possible in more advanced languages that implement complicated algorithms, such as Sage but the fact that the J built-in primitives are all fairly simple ensures that the results are freer from manipulations. For example, some advanced languages have built-in functions like SHA-1 that already incorporate some cryptographic constants.

Further, any similarly sized integers would have a J specification of similar size. The Curve25519 field size has a J specification of just 10 characters:

$$19\text{-}{\sim}2x\hat{\ }255$$

In terms of J specifications, the description of F can be quite compact but pseudorandom. Further, Z needs to have a J specification with fewer than 56 characters, which is the approximately minimum number of characters needed to express a random 256-bit integer in J characters.

In some implementations, the pseudorandom function F can be chosen based on an iterated three-term function. For example, an example choice of F is based on iterating a primitive function $f$ seven times, with the number of iterations to be justified below. For the compactness of F, its J specification and a direct J specification of Z can be specified. If one can find another pseudorandom function with a shorter J specification, then that would undermine the compactness of F.

In some implementations, F first needs to be a pseudorandom function, which is a question independent of its J specification. Therefore, F can be described first in more conventional mathematical notation. Note that most existing pseudorandom functions already used in cryptography are deficient in the sense of not being sufficiently compact.

Abstractly, the primitive function $f$ includes the definition of field size, which in this case is $p=2^{255}-19$. One example primitive function $f$ used here is given as:

$$f(x)=(2^x \bmod p)+(3^x \bmod p)+(5^x \bmod p).$$

The output of $f$ varies between 0 and $3p-1$. The input can be any integer, but the input only matters modulo $p-1$, or more precisely modulo the least common multiple of the orders of 2, 3, and 5. In some implementations, the primitive function $f$ can be a puzzle and can be iterated to amplify the difficulty of the puzzle.

The purpose of choosing three terms, instead of one or two, is to reduce the possibility that for some choice of primes p, all the terms in the sum have low period as a function of x. In other words, the primitive $f$ is intended to be usable for any prime p.

The purpose of using the exponential functions is to be efficiently computable, yet moderately hard to invert. An individual exponentiation function is invertible using the number field sieve algorithm.

The difficulty of this inversion step helps to support the pseudorandomness. Next, iterate $f$ seven times, so:

$$F(x)=f(f(f(f(f(f(f(x))))))).$$

In some instances, the iteration directly improves neither the general pseudorandomness nor the general non-invertibility. Instead, the iteration helps in two ways: first, to ensure that F(x), for very small inputs, like 0 and 1, seems to overshoot p, and thereby ensures the standard radix representation of F(x) will not be shorter than F. Only a few iterations are needed to cause such overshot; second, if a weaker variant $f$ with just one exponential term is used, then given a small input x, the baby-step-giant-step algorithm could be used to invert $f$ on these small inputs faster than exhaustive search. Iterating such a variant $f$, even with just two applications of $f$, seems to prevent baby-step-giant-step attacks. In other words, after the first application of $f$, the next input to $f$ is large, so there is no speed-up available to invert $f$ more quickly than for random inputs. If iteration helps with this weaker variant $f$, then maybe it helps with the chosen $f$. In other words, it may be plausible that the iteration improves the non-invertibility on small inputs.

7 iterations were chosen because this is the smallest prime not yet in appearing in the definition of F. Additional or different number of iterations can be used.

Note also that, in iterating $f$, modulo p between each iteration is not reduced. This helps to keep the J specification shorter, but also seems to slightly add some further pseudorandomness, in the sense that the pipeline for F is slightly wider than its input or output values.

Now F can be specified in the programming language J. For example, the first example specification of F is as a J "adverb":

$$(\&|)(@(2\ 3\ 5\&\hat{\ }))(+/@)(\hat{\ }:7)$$

This J specification uses 26 characters and is the same example described above with respect to the complexity measure of the J programming language. As discussed above, J variable p can be defined as follows:

$$p\mathord{=:}\ 19\text{-}{\sim}2x\hat{\ }255$$

But rather than using multiple lines of code and more characters, unroll all of the above into a single line of J code that specifies F(0) in 35 characters:

$$7\&(2\ 3\ 5\&(+/@:((19\text{-}{\sim}2x\hat{\ }255)\&|@\hat{\ })))0$$

Note that, in unrolling F, a standalone J adverb is no longer needed for building F from a prime. Instead, a verb for F has been directly created using J's usual tacit definitions. This unrolling has saved a few characters, since $35<10+26+1<12+26+1$.

If the index m requires 6 decimal digits to be represented, then F(m) can be represented in 40 J characters, which is fewer than the 56 that might be needed using a conventional radix expansion in J. This suggests that the form of F(m) is the most compressible in J, which can be viewed as a weak form of evidence that Z is compact.

As a second example of a pseudorandom function, the function has a J specification as an adverb using 27 characters:

$$(\&|)(@\hat{\ })\mathord{\sim}(@\mathord{>}\mathord{:})(\hat{\ }:(<9))(+/@)$$

Given that this function uses one more character in its J specification than the function from the previous section, one can rule it out for being non-minimally compact under the chosen measure. Nevertheless, this example is presented to demonstrate how one might disqualify another candidate pseudorandom function for having a longer specification and to provide this example as a backup pseudorandom function in case the previous function is determined to be insufficiently pseudorandom.

In some implementations, when trying to find a compact pseudorandom function, it may be useful to compile a list of plausible candidates that can easily be compared based on specification. The more difficult task is to assess the pseudorandomness of each candidate function. Again, the pseudorandomness can be assessed objectively by exhibiting distinguishers. Therefore, having such an alternative candidate specification can be useful just in case the previous shorter specification turns out to have some flaw, say in its pseudorandomness. For example, it might be worth investigating how many characters might be saved in an unrolled specification of Z, with this function (just as we unrolled the specification of Z with the previous example.)

The second function F can be abstractly described and its pseudorandomness can be justified. It uses a primitive function $f$ defined by $f(x)=(x+1)^{(x+1)}$ mod p, which can be referred to as self-exponentiation. (The addition of one prevents fixed points at 0 and 1). Instead of simple iteration to build F from $f$, here a summed iteration is used: $F(x)=x+f(x)+f^2(x)+\ldots+f^8(x)$, where the exponents indicate repeated application. Unlike simple iteration, the summed iteration seems to contribute to both pseudorandomness and non-invertibility, and happens to be compact to implement in J. For example, consider how hash functions, such as SHA2, have a compression function F that maps x to $x+f(x)$, where $f$ is some invertible function (and + is element-wise addition of arrays modulo the computer word size). If this construction takes an invertible $f$ and produces a non-invertible F, then it potentially improves non-invertibility in general. Here, multiple iterations are added together because more iterations and terms potentially further increase non-invertibility, and a single iteration is not enough for the chosen $f$ when considering small inputs because applying a singly summed iteration to input x=0 yields $x+f(x)=0+f(0)=f(0)=1^1$ mod p=1, which is unacceptable as a random value. More precisely, the goal was that, for any sufficiently small x that one can feasibly find, if $y=f(x)$, then $f(x)$ can always be the most compact representation of y, and in particular more compact than the default representation of y. In this case, if defined this way, it would fail to meet its goal. This defect seems to be fixed by using more iteration in the sum. And for the specification to be as small as possible, the J specification is more compact than conventional mathematical notation.

In some implementations, a more thorough approach might take the form of a competition, such as the competition used for AES and SHA3. As an example, the rules of the competition may work as follows. Anybody can submit a J specification for the function. The rules may either specify that F is submitted or that Z is submitted. After the initial submission, then there would be public review period, during which challengers can try to refute the pseudorandomness of the candidates by demonstrating a distinguisher or a compressor.

Once the public review period has expired, the shortest candidate whose pseudorandomness has not been refuted wins. Given ties in length, then some lexicographic order can be used, or perhaps order of submission.

In some implementations, the competition can be held periodically, or can be kept as ongoing. In the periodic version, the competition is held again at newly scheduled time, with possibly new outcomes. In the ongoing version, there are no submission and challenge deadlines. Rather, at any time, there are a number of candidates and challenges, each of which can be submitted at any time. The shortest (earliest) candidate without a successful challenge is deemed the current champion. In the ongoing competition, the champion could change erratically, either by a new candidate, or by a successful challenge of the current champion.

It is possible that all candidates will be successfully challenged, in which case there would no champion. To handle this, one might throw in some very trustworthy pseudorandom functions, such as SHA2 and Keccak and something based on RSA or even ECDLP. These functions would have much longer specification, but would be unlikely to have their pseudorandomness successfully challenged.

A more elaborate example is described as follows. In particular, given a compact pseudorandom function F that takes input and produces outputs of non-negative integers, and the target quantity Z can be determined as follows:

$$Z=F(m+F(W(C,R,m)))$$

where m is the minimal input such that Z meets the given constraints, and W is a proof-of-work function that is moderately difficult to compute (and has an output range compatible with the input range of F), C is a customization value, and R is value obtained as true source of randomness.

An example of W is described as follows. To compute W(C, R, m), first compute $N=F(C+F(m+F(R))$. Then, form a set including all of the positive divisors of N+1, N+2, N+3, N+4, N+5, N+6. Apply F to each divisor and sum. The main task of the work is the factorization. A certificate of the factorizations can also be provided to help make verification of the work easier. In some implementations, the size of the factorizations can be boosted. In some implementations, the factorization problem can be replaced by a discrete logarithm problem or else some repeated computation, such as repeated application of F.

The customization value C can be a short string, such as "CFRG" converted to a number in a fairly standard manner, agreed upon in advance. The random value R can be a value difficult to predict, yet fairly easy for anybody to verify. For example, R can be derived from the solar sunspot status at some point in the future. The sun rotates about once every 25 days. Around the vernal or autumnal equinox most places on earth will have a view of the sun if weather permits. Assuming a clear sky once among 10 days surrounding, the equinox might provide enough opportunity for every observer on earth to view the middle portion of the sun.

In some implementations, some further method may be used to digitize the current sunspot status. This could be agreed upon by a rules committee. An authority can form an image of the sun, at a level of detail that makes predicting it difficult for anybody, but at a low enough detail to make it easily verifiable by others. The image may also account for the rotation of the sun, so that verification is possible days after the image is taken, by suitably transforming the image. This approach would allow the official image to be distributed across the internet, with any cautious user being able to verify the image.

The advantage of using the sunspots like this is that sunspots are less subject to manipulation than some other events (e.g., stocks or news), and they are globally available, not just locally available like weather (and can, therefore, bypass using the internet for authenticated sharing). In some implementations, users can use their own value of C, albeit at the cost of using a different elliptic curve. In some implementations, it may make sense to pursue the definition of W and R before the definition of F.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A cryptography method comprising:
obtaining, by an electronic device, astronomical data from an observed astronomical event;
seeding, by the electronic device, a pseudorandom generator based on the astronomical data, wherein the pseudorandom generator includes a compact source code in a computer programming language;
after, by the electronic device, seeding the pseudorandom generator, obtaining an output from the pseudorandom generator;
generating, by the electronic device, a parameter for a cryptographic function by operation of one or more data processors using the output from the pseudorandom generator;
generating a customized set of parameters for the cryptographic function, wherein the customized set of parameters are based on the astronomical data and a user-selected input value;
encrypting, by the electronic device, data using the cryptographic function; and
transmitting, by the electronic device, the encrypted data.

2. The method of claim 1, wherein the observed astronomical event comprises an event that is globally observable and globally verifiable on an extraterrestrial planet.

3. The method of claim 1, wherein the observed astronomical event comprises a sunspot, and obtaining the astronomical data comprises computing the astronomical data based on an attribute of the sunspot.

4. The method of claim 1, wherein the observed astronomical event comprises a supernova, and obtaining the astronomical data comprises computing the astronomical data based on an attribute of the supernova.

5. The method of claim 1, wherein the observed astronomical event comprises a meteoroid discovery, and obtaining the astronomical data comprises computing the astronomical data based on an attribute of a meteoroid.

6. The method of claim 1, wherein the observed astronomical event comprises an event on an extraterrestrial planet, and obtaining the astronomical data comprises computing the astronomical data based on an attribute of the event.

7. The method of claim 1, wherein the observed astronomical event and the pseudorandom generator are specified by a cryptosystem protocol, and the cryptosystem protocol permits a range of values for the user-selected input value.

8. The method of claim 1, wherein generating the parameter for the cryptographic function using the output from the pseudorandom generator comprises generating a constant of an elliptic curve function using the output from the pseudorandom generator.

9. The method of claim 8, wherein the generated parameter for the cryptographic function has a larger size in memory than the compact source code.

10. The method of claim 1, comprising generating a full set of parameters for the cryptographic function from the output from the pseudorandom generator.

11. A computing system comprising one or more hardware data processors configured to perform operations comprising:
obtaining, by an electronic device, astronomical data from an observed astronomical event;
seeding, by the electronic device, a pseudorandom generator based on the astronomical data, wherein the pseudorandom generator includes a compact source code in a computer programming language;
after seeding the pseudorandom generator, obtaining, by the electronic device, an output from the pseudorandom generator;
generating, by the electronic device, a parameter for a cryptographic function by operation of one or more data processors using the output from the pseudorandom generator;
generating a customized set of parameters for the cryptographic function, wherein the customized set of parameters are based on the astronomical data and a user-selected input value,
encrypting, by the electronic device, data using the cryptographic function; and
transmitting, by the electronic device, the encrypted data.

12. The system of claim 11, wherein the observed astronomical event comprises an event that is globally observable and globally verifiable on an extraterrestrial planet.

13. The system of claim 12, wherein the observed astronomical event comprises at least one of a sunspot, a supernova, a meteoroid discovery, or an event on an extraterrestrial planet.

14. The system of claim 11, wherein the observed astronomical event and the pseudorandom generator are specified by a cryptosystem protocol, and the cryptosystem protocol permits a range of values for the user-selected input value.

15. The system of claim 11, wherein generating the parameter for the cryptographic function using the output from the pseudorandom generator comprises generating a constant of an elliptic curve function using the output from the pseudorandom generator.

16. The system of claim 15, wherein the generated parameter for the cryptographic function has a larger size in memory than the compact source code.

17. The system of claim 11, the operations comprising generating a full set of parameters for the cryptographic function from the output from the pseudorandom generator.

18. A non-transitory computer-readable medium storing instructions that, when executed by a data processing apparatus, cause the data processing apparatus to perform operations comprising:
obtaining, by an electronic device, astronomical data from an observed astronomical event;
seeding, by the electronic device, a pseudorandom generator based on the astronomical data, wherein the pseudorandom generator includes a compact source code in a computer programming language;
after seeding the pseudorandom generator, obtaining, by the electronic device, an output from the pseudorandom generator;
generating, by the electronic device, a parameter for a cryptographic function by operation of one or more data processors using the output from the pseudorandom generator;
generating a customized set of parameters for the cryptographic function, wherein the customized set of parameters are based on the astronomical data and a user-selected input value;
encrypting, by the electronic device, data using the cryptographic function; and
transmitting, by the electronic device, the encrypted data.

19. The computer-readable medium of claim 18, wherein the observed astronomical event comprises at least one of a sunspot, a supernova, a meteoroid discovery, or an event on an extraterrestrial planet.

20. The computer-readable medium of claim 18, wherein the observed astronomical event and the pseudorandom generator are specified by a cryptosystem protocol, and the cryptosystem protocol permits a range of values for the user-selected input value.

21. The computer-readable medium of claim 18, wherein generating the parameter for the cryptographic function using the output from the pseudorandom generator comprises generating a constant of an elliptic curve function using the output from the pseudorandom generator wherein the generated parameter for the cryptographic function has a larger size in memory than the compact source code.

22. The computer-readable medium of claim 18, the operations comprising generating a full set of parameters for the cryptographic function from the output from the pseudorandom generator.

* * * * *

UNITED STATES PATENT AND TRADEMARK OFFICE
CERTIFICATE OF CORRECTION

| | |
|---|---|
| PATENT NO. | : 11,316,665 B2 |
| APPLICATION NO. | : 16/449288 |
| DATED | : April 26, 2022 |
| INVENTOR(S) | : Daniel Richard L. Brown |

It is certified that error appears in the above-identified patent and that said Letters Patent is hereby corrected as shown below:

On the Title Page

Item (73) (Assignee), Line 1, delete "Certicom Corp., Mississauga (CA)" and insert -- BlackBerry Limited, Waterloo (CA) --.

Signed and Sealed this
Eighth Day of November, 2022

Katherine Kelly Vidal
*Director of the United States Patent and Trademark Office*